J. A. DORAN.
MILITARY ORNAMENT.
APPLICATION FILED NOV. 6, 1917.
1,275,139.                                             Patented Aug. 6, 1918.
Fig.1.                                                 Fig.2.
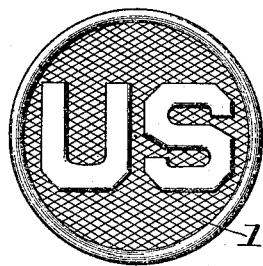
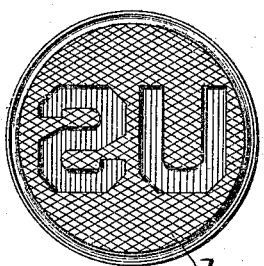
Fig.3.
Fig.4.                                                 Fig.5.
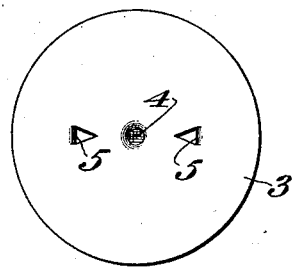
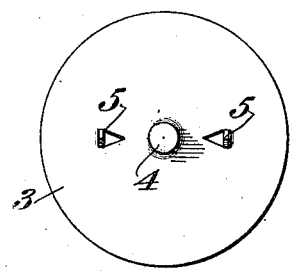
Fig.6.
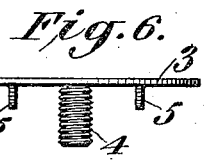
Fig.7.
Fig.8.
Fig.9.
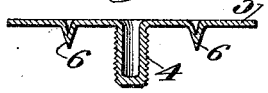
Inventor
James A. Doran
by Wm. W. Finckel
Attorney

UNITED STATES PATENT OFFICE.

JAMES A. DORAN, OF PROVIDENCE, RHODE ISLAND.

MILITARY ORNAMENT.

1,275,139.  Specification of Letters Patent.  Patented Aug. 6, 1918.

Application filed November 6, 1917. Serial No. 200,586.

*To all whom it may concern:*

Be it known that I, JAMES A. DORAN, a citizen of the United States, residing at Providence, in the county of Providence and State of Rhode Island, have invented a certain new and useful Improvement in Military Ornaments, of which the following is a full, clear, and exact description.

The object of this invention is to provide a strong, durable, light-weight and economically manufactured separable fastener, more especially designed for use in connection with ornaments to be applied in a detachable way to garments and other articles, and more particularly to military uniforms.

Heretofore it has been customary to make collar ornaments for military and other uniforms by using a solid embossed medal, which is necessarily quite thick in order to secure sharp detail in design. On the back of the medal it has been customary to solder a screw and two fixing points, the screw being engaged by a nut to attach the medal to the garment, and the points engaging the material of the garment or other article in order to hold the ornament in desired position thereon. This construction results in a quite heavy article, and the solder joint is of more or less uncertain strength and durability.

By the present invention the great weight of metal and the uncertain strength of the screw joint and points are overcome by providing a back plate, the screw and the points in one piece, the front or face being formed by drawing up a shell or cup of thin metal, which is embossed with the required design or insignia, and having a flange which is closed down over the edge of the back, preferably with a curled rolled edge, whereby is produced an article of great strength and very light weight, two very important advantages in military equipment; the saving of metal, and the economies in manufacture resulting in a much lower cost of production.

In the accompanying drawings illustrating the invention, in the several figures of which like parts are similarly designated, Figure 1 is a plan view, Fig. 2 is an inverted view, and Fig. 3 is a transverse section of the face shell or cup. Fig. 4 is a plan view, Fig. 5 is an inverted view, and Fig. 6 is a side elevation of the one-piece back. Fig. 7 is a cross-section of the shell and back assembled as the finished article. Fig. 8 is a cross-section of a preferred form of light-weight one-piece nut, preferably used in connection with the ornament. Fig. 9 is a cross-section showing hollow fixing prongs.

The shell 1 may be of any desired metal to meet the requirements of the user, and it may be ornamented in any desired way and supplied with any desired design or insignia. This shell is drawn up as a cup with the flange 2 which affords the means by which the shell is applied to the back next described.

The back 3 is a disk of metal, having the projection or stem 4 drawn therefrom substantially as a hollow rivet or an eyelet is drawn, and externally screwthreaded for use in connection with a nut or other device for attaching the ornament to a garment or other article. In order to hold the ornament in the desired position, prongs 5 are struck up from the body of the disk and extended therefrom in the direction of the length of the stem 4. These prongs may be made in any of a variety of forms, either solid as shown in Figs. 4, 5, 6 and 7, or hollow as shown in Fig. 9; in this latter case, the hollow prongs 6 would be drawn down from the metal of the disk, instead of being cut as previously described. Any number of prongs may be used, one, two or more as may be required.

As shown in Fig. 7, the shell and the back are assembled by placing the shell over the back and then transforming the flange 2 into a curled rolled edge 7.

Instead of the heavy solid nut heretofore commonly used for attaching military ornaments to garments, I prefer to use a nut made of sheet metal, as shown in Fig. 8, in which there is a rolled rim 8, a central raised portion 9, and a central tubular socket portion 10 which is internally screwthreaded to receive and engage with the screwthreaded stem 4 of the back.

It will be observed that the shell or face is in one piece, and that the back with its screwthreaded stem and prongs is in one piece, and that the preferred form of nut likewise is in one piece. All of these parts may be economically made of sheet metal, with a resulting economy in weight of metal and cost of production, and of a strength and durability equal to or rather superior to the old-style heavy castings.

By the term "military ornaments" herein,

I do not wish to be understood as limiting my invention, but it is to be understood that not only ornamental devices but also devices of primary utilitarian purpose are included.

Variations in construction and arrangement are permissible within the principle and scope of the invention as hereinafter claimed.

What I claim is:—

1. A military ornament, comprising a back including a disk, a stem and fixing points all made in one integral piece, and a face shell having a flange curled over the edge of the disk and thereby united therewith and having the ornament or design or insignia required, and a fastening nut adapted to engage the screw stem to fasten the ornament in place.

2. A military ornament, comprising a back including a disk, a screw stem and fixing points all made in one integral piece of sheet-metal, and a one-piece shell-form face having the ornament, design, or insignia required and a depending flange which is curled about the edge of the disk to unite the back and face, and a fastening nut adapted to engage the screw stem to fasten the ornament to a garment.

3. A light-weight military ornament, comprising a sheet metal back, including in one integral piece a disk, a screw stem and fixed points, a sheet metal embossed face-shell having a flange curled about the edge of the disk, and a one-piece sheet metal nut adapted to receive and engage the stem of the back.

In testimony whereof I have hereunto set my hand this 9th day of October, A. D. 1917.

JAMES A. DORAN

Witnesses:
N. R. DORAN,
A. T. POWERS.

Copies of this patent may be obtained for five cents each, by addressing the "Commissioner of Patents, Washington, D. C."

It is hereby certified that in Letters Patent No. 1,275,139, granted August 6, 1918, upon the application of James A. Doran, of Providence, Rhode Island, for an improvement in "Military Ornaments," an error appears in the printed specification requiring correction as follows: Page 2, line 32, claim 3, for the word "fixed" read *fixing;* and that the said Letters Patent should be read with this correction therein that the same may conform to the record of the case in the Patent Office.

Signed and sealed this 3d day of September, A. D., 1918.

[SEAL.]

F. W. H. CLAY,

*Acting Commissioner of Patents.*

Cl. 24—105.